(12) United States Patent
Kinney

(10) Patent No.: US 6,938,937 B1
(45) Date of Patent: Sep. 6, 2005

(54) WEED REMOVAL DEVICE

(76) Inventor: Frank N. Kinney, 300 Fountain Ave., Ellwood City, PA (US) 16117

( * ) Notice: Subject to any disclaimer, the term of this patent is extended or adjusted under 35 U.S.C. 154(b) by 0 days.

(21) Appl. No.: 10/719,842

(22) Filed: Nov. 24, 2003

(51) Int. Cl.⁷ .............................................. A01D 9/06
(52) U.S. Cl. ..................... 294/50.9; 254/132
(58) Field of Search .............. 294/50.9, 50.6, 294/19.1, 104; 254/132, 131.5; 172/371

(56) References Cited

U.S. PATENT DOCUMENTS

| | | | | |
|---|---|---|---|---|
| 779,984 A | * | 1/1905 | Allen ........................... | 254/132 |
| 3,222,699 A | * | 12/1965 | Zeisig ........................... | 7/158 |
| 3,865,348 A | | 2/1975 | Close | |
| 4,147,329 A | * | 4/1979 | Rodriguez .................. | 254/132 |
| 4,281,866 A | | 8/1981 | Atcheson | |
| 4,547,010 A | * | 10/1985 | Camp ........................ | 294/50.9 |
| 4,630,366 A | | 12/1986 | Fry | |
| 4,704,758 A | * | 11/1987 | Hoffman ..................... | 15/144.4 |
| 4,856,759 A | * | 8/1989 | Ness ........................... | 254/132 |
| 5,232,256 A | * | 8/1993 | Forbes ........................ | 294/19.1 |
| 5,743,340 A | * | 4/1998 | Giacomini ................... | 172/371 |
| 5,782,518 A | * | 7/1998 | Scruggs ........................ | 294/57 |
| 6,016,876 A | | 1/2000 | Rountree et al. | |
| 6,290,211 B1 | * | 9/2001 | Pheiffer ....................... | 254/132 |
| 6,505,869 B2 | | 1/2003 | Novotny | |
| 6,691,793 B2 | * | 2/2004 | Ota .............................. | 172/371 |
| 6,698,526 B1 | * | 3/2004 | Mathisen ..................... | 172/371 |

* cited by examiner

Primary Examiner—Kathy Matecki
Assistant Examiner—Esther O. Okezie
(74) Attorney, Agent, or Firm—Harpman & Harpman

(57) ABSTRACT

A weeding tool for selectively engaging, gripping and removing a weed from the ground. The weed extraction device utilizes an elongated handle with a remotely operable weed engagement jaw on an angular offset ground engagement end. A jaw activation lever pivotally extends from the handle that also becomes a fulcrum after the jaw closes on the weed to remove the weed from the ground after it has been electively gripped in one continuous motion.

9 Claims, 5 Drawing Sheets

WEED REMOVAL DEVICE

BACKGROUND OF THE INVENTION

1. Technical Field

This invention relates to gardening tools and more specifically to weeding tools that are used for digging up and removing weeds by the root.

2. Description of Prior Art

Prior art devices of this type have relied on a variety of different designs for removing weeds from the ground; see for example U.S. Pat. Nos. 3,865,348, 4,281,866, 4,630,366, 4,016,876 and 6,505,869.

In U.S. Pat. No. 3,865,348, a weed puller is disclosed having a handle with a V-shaped weed engagement notch extending from one end. A foot engagement portion extends from the weed notch allowing the user to hold the device in position and then with the handle move in a rocking manner to pull the weed.

U.S. Pat. No. 4,281,866 shows a weed puller and ejector in which a V-shaped slot extends from an elongated handle with an ejector element deployable therein from a remote spring urged plunger.

A weed cutting and extracting tool is claimed in U.S. Pat. No. 4,630,366 wherein an adjustable handle is illustrated having a flat retaining spring with a blade that holds the weed after it is cut.

A weed extractor can be seen in U.S. Pat. No. 6,016,876 in which a bit portion defines a weed engagement jaw that is selectively closed by remote handle and spring urged pivot arm.

Finally, in U.S. Pat. No. 6,505,869 describes a combination weeding tool in which a rod attachment has multiple attachment fulcrum allowing for a single weed extraction lifting blade and multiple tined rake deployable about the fulcrum ring.

SUMMARY OF THE INVENTION

A combination weed engagement and extraction tool for selective one-step gripping and lever action removal of a weed by its roots from the ground. The device combines a jaw activation lever with a fulcrum to enhance the weed engagement leverage needed to pull the weed from the ground.

DESCRIPTION OF THE PREFERRED EMBODIMENT

Figure 1:
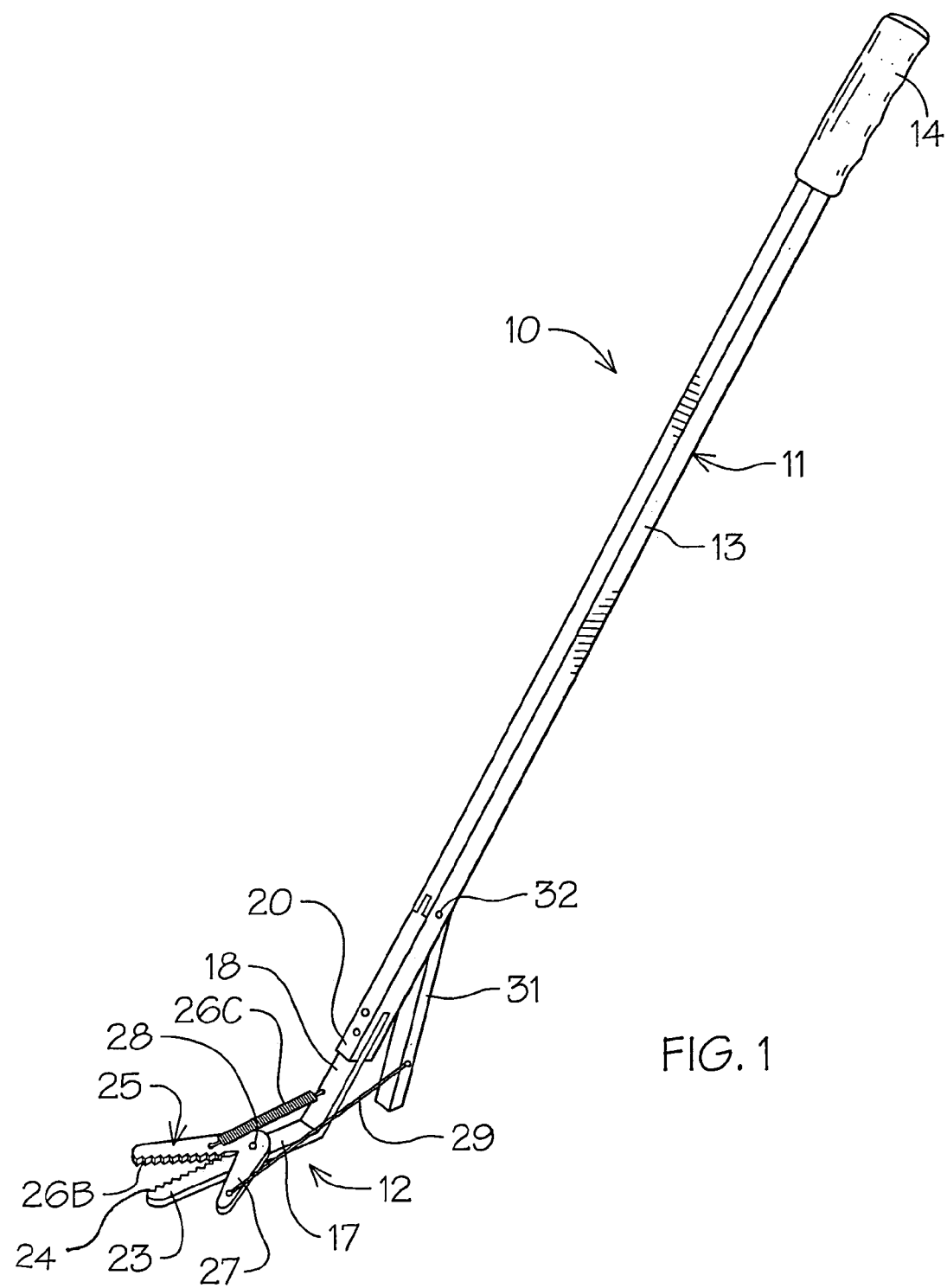
FIG. 1 is a perspective, front, side and top view of the weed pulling device of the invention.

Referring now to FIG. 1 of the drawings, a weed puller 10 can be seen having a handle portion 11 and a weed engagement portion 12. The handle portion 11 has an elongated handle shaft 13 with an end handgrip portion with a contoured end handgrip 14 thereon. The weed engagement portion 12 extends from the distal end of the handle shaft 13 with a flat jaw support element 17 extending angularly from a flat mounting portion 18 thereon. The distal end of the handle shaft 13 is bifurcated by a slot 19 extending inwardly for receiving the mounting portion 18 therein. The pair of longitudinally spaced and aligned apertures at A extend through respective bifurcated portions 20 and 21 and correspondingly aligned apertures in the mounting portion 18 there between. Fasteners F extend through the so aligned apertures securing the weed engagement portion 12 thereto as will be well understood by those skilled in the art.

Figure 3:
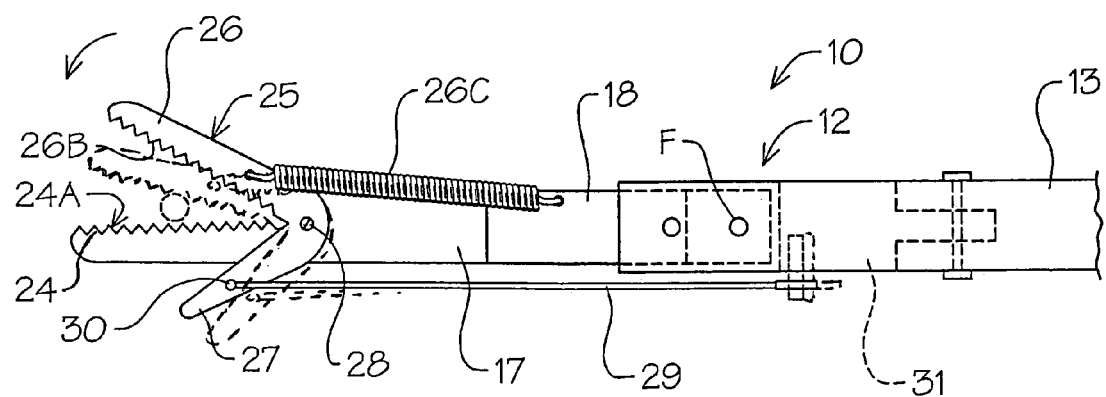
FIG. 3 is an enlarged partial top plan view thereof illustrating the jaw closing in broken lines.

The angularly offset flat jaw support element 17 has an angular offset area of reduced transverse dimension at 23 with a plurality of bi-angularly longitudinally spaced notches at 24 there along defining a gripping surface jaw 24A as best seen in FIG. 3 of the drawings. A movable opposing jaw element 25 has an engagement lever 26 and an activation lever 27 and is pivotally secured to the jaw support element 17 via a pivot pin 28. The engagement lever 26 and activation lever 27 are angularly disposed to one another to impart a "lever" action upon movement in relation to the jaw support element 17 as indicated by directional activation arrow 29.

The jaw engagement lever 26 has a plurality of "teeth" formed along its gripping edge 26B with a spring 26C extending there from to the jaw support element 17 portion in longitudinally alignment with said handle shaft as best seen in FIG. 3 of the drawings.

Figure 2:
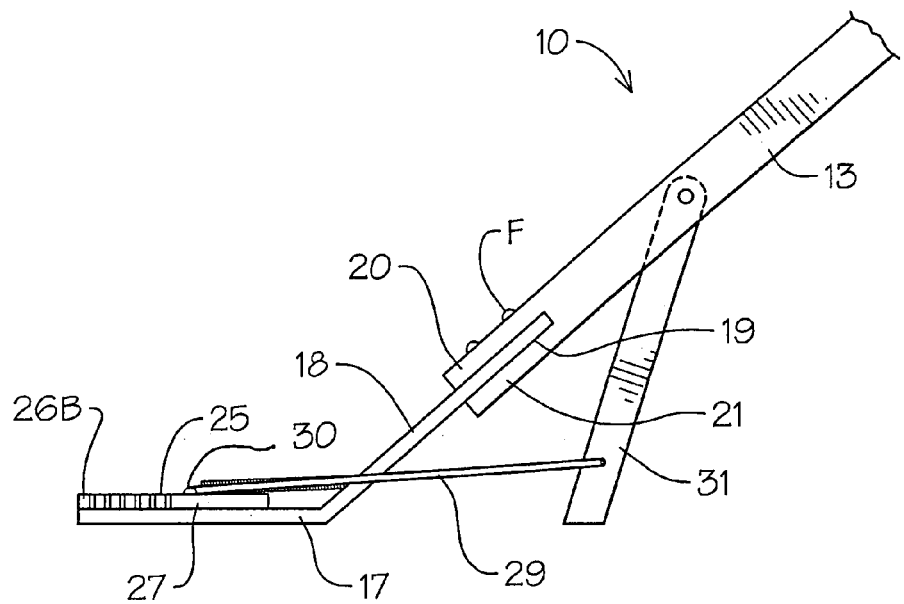
FIG. 2 is a partial side elevational view thereof.

The activation lever portion 27 has a control rod 29 pivotally extending there from at 30 to a movable ground engagement leverage arm 31 that pivotally extends from the handle shaft 13 in spaced longitudinal relation to the mounting portion 18 of the weed engagement portion 12 as best seen in FIGS. 2 and 3 of the drawings. The activation arm 31 is angularly disposed from the handle shaft 13 having a shaft engagement pivot pin 32.

Figure 4:
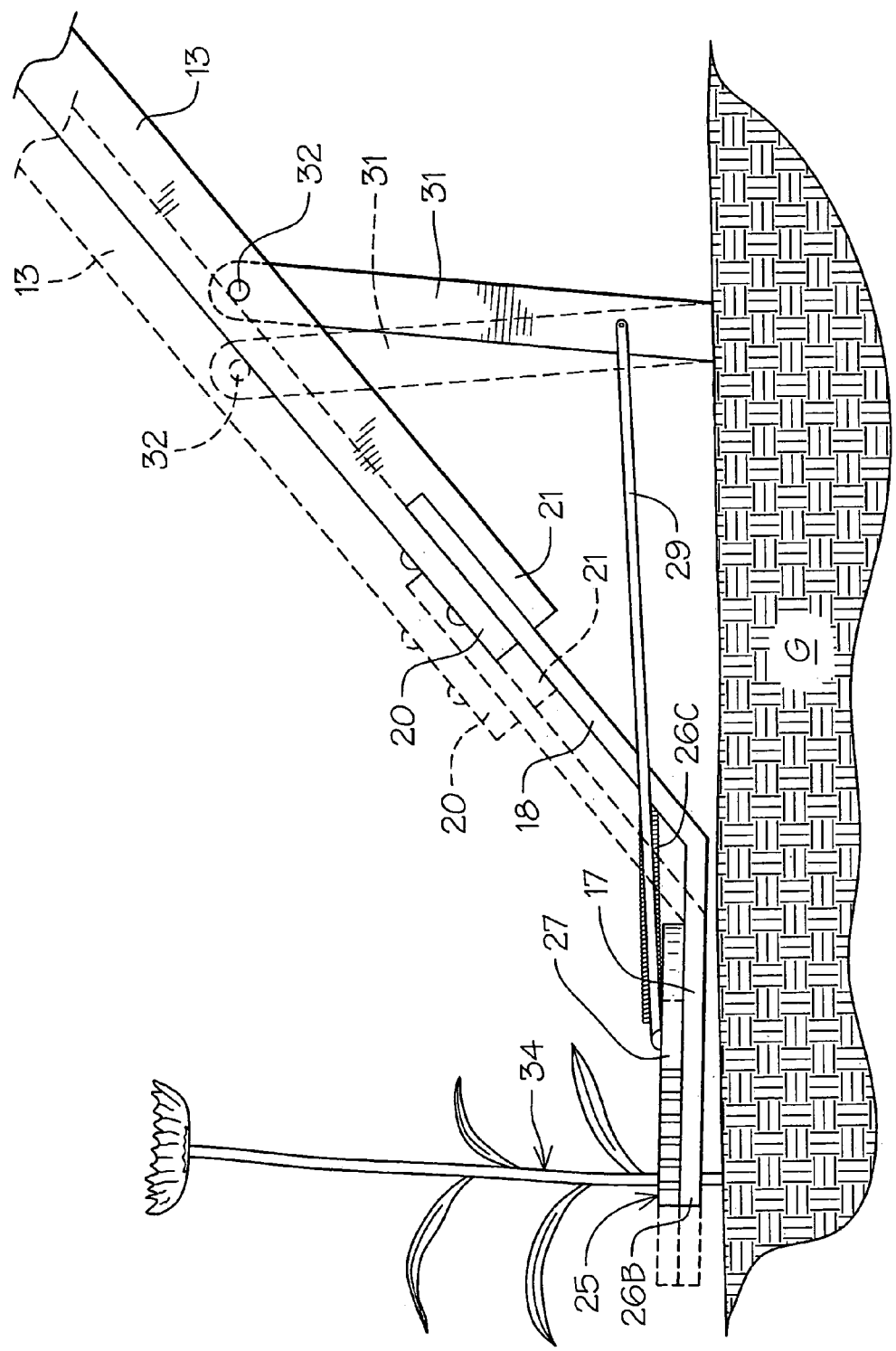
FIG. 4 is an enlarged partial side elevational view thereof showing the device of the invention before engaging a weed and engaged on the weed in broken lines.

Referring now to FIG. 4 of the drawings, the weed puller 10 of the invention can partially be seen in use as hereinbefore described with the angular offset area of reduced transverse dimension at 23 with the bi-angular spaced notches 24 and opposing movable jaw element 25 to form co-planar weed pinching jaw assembly that is to be positioned about a weed 34. The user (not shown) by moving the weed puller 10 forward about the weed 34, the activation arm 31 pivotally extending from the handle shaft 13 will simultaneously engage by the ground G retracting the control rod 29 and correspondingly closing the movable jaw element 25 towards the fixed gripping jaw surface 24A defined by the angular offset area of reduced transverse dimension at. 23 thus firmly gripping the weed 34 at its base there between as shown in broken lines and in FIG. 5 of the drawings.

Figure 5:
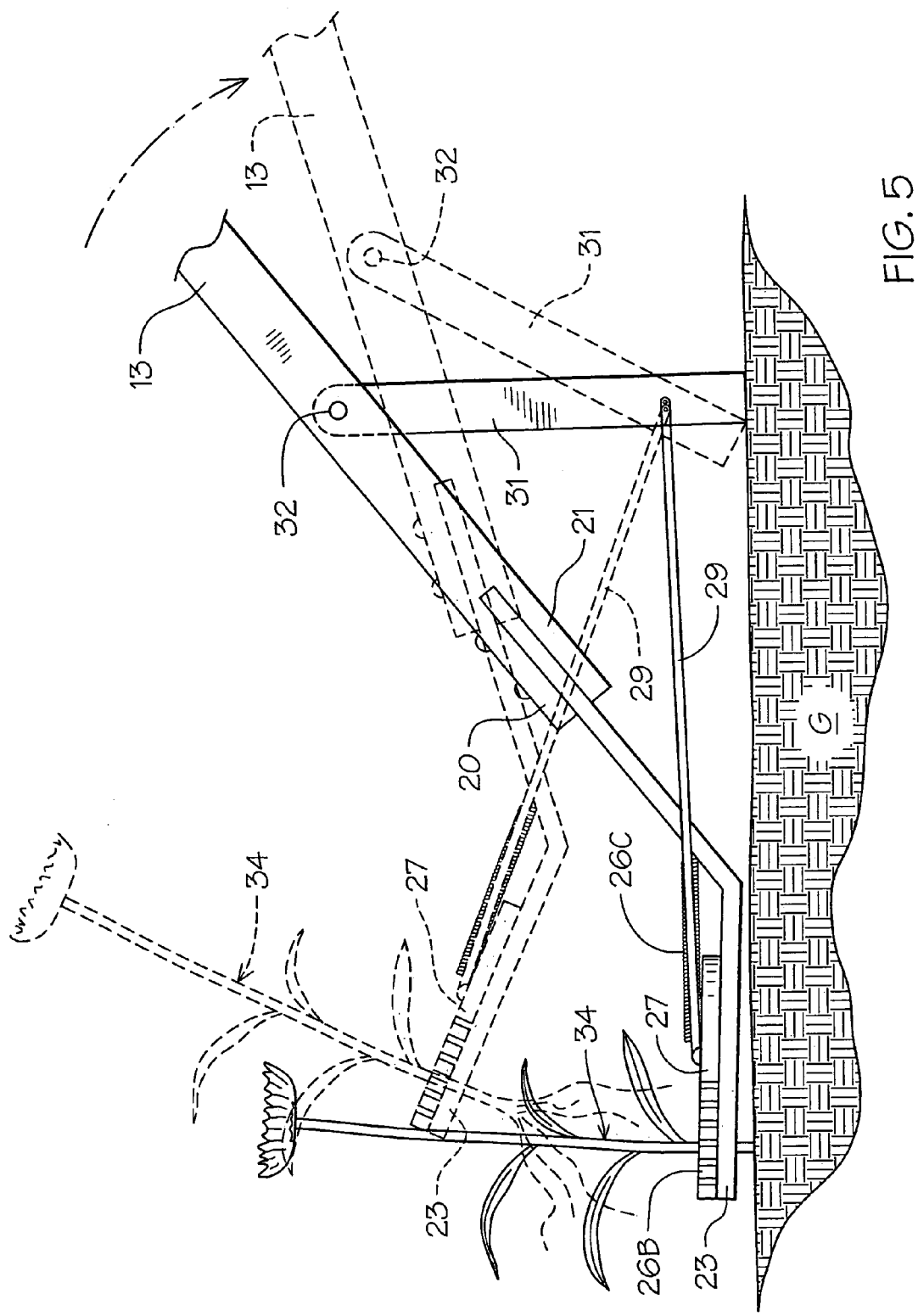
FIG. 5 is an enlarged partial side elevational view thereof showing the invention engaging the weed and removing it in broken lines.

By moving the handle portion 11 arcuately downwardly the ground engaging activation arm 31 acts as a fulcrum pulling the weed 34 easily from the ground G as shown in broken lines in FIG. 5 of the drawings in broken lines.

Once the weed 34 is removed, the opposing jaws 24A and 25 will be effectively released from the weed 34 engagement position by moving back the handle portion 14. It will be evident to those skilled in the art that upon disengagement from the ground the opposing jaw lever 26 is automatically returned to its open position by a return spring 26C to effectively reset the device for its next weed engagement as illustrated in FIGS. 1 and 3 of the drawings.

Figure 6:
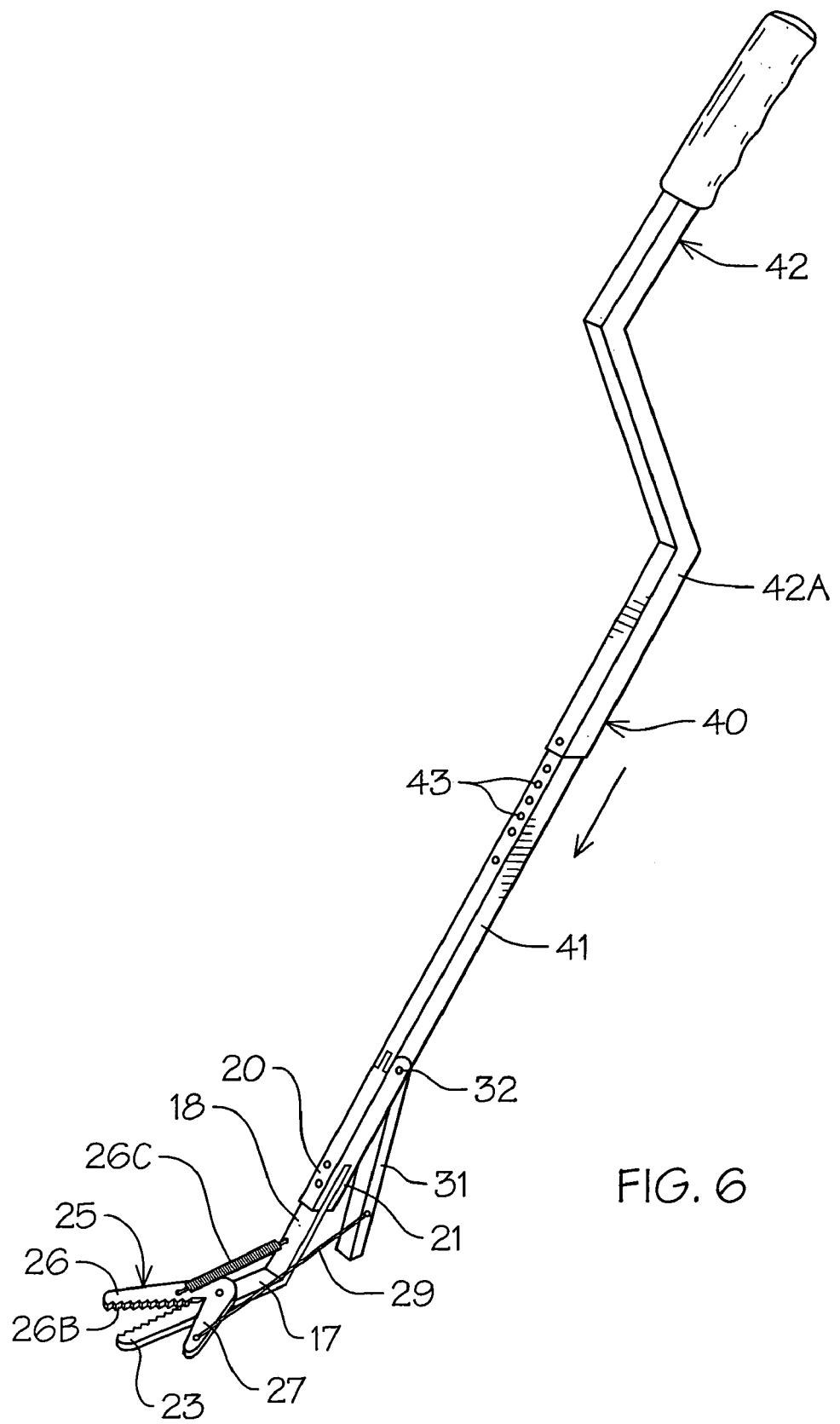
FIG. 6 is a side elevational view of an alternate form of the invention having an offset engagement handle and telescopically extensible shaft.

Referring now to FIG. 6 of the drawings, an alternate form of the invention can be seen in which the handle shaft 13 has been modified to form an adjustable handle 40 having a base handle shaft portion 41 with a telescopically disposed parallel offset upper handle grip portion 42 within. Interengaging release button 43 allow for the release and alternately locking of the respective handle portions 41 and 42A for extension or collapsation. It will be evident that the offset handgrip portion 42 provides additional leverage advantage by efficiently reducing the distance to the ground that the handle must travel to effectively "lever out" the gripped weed 34, as noted. This alternate handle will provide for dual use of the weed puller 10 of the invention by effectively elongating or foreshortening of the handle 40 which may be required in desired use configuration employed by the user in various weed removal venues. It will also be evident from the above descriptions that the primary form of the invention illustrated in FIG. 1 of the drawings can also be telescopically adjustable in handle length if so required.

It will thus be seen that a new and novel weed extractor device has been illustrated and described and it will be apparent to those skilled in the art that various changes and modifications may be made therein without departing from the spirit of the invention.

Therefore I claim:

1. A weed extractor having,
   an elongated handle shaft and a weed engagement portion extending there from, said weed engagement portion comprising,
   a jaw support element angularly offset to the longitudinal axis of said handle shaft extending from angularly offset to the longitudinal axis of said handle shaft extending from the shaft at its distal end,
   a movable jaw assembly pivotally secured to said jaw support element inwardly of its free end,
   resilient means extending from said jaw assembly to said jaw support,
   an activation arm pivotally secured to and extending from said handle shaft in spaced relation to said jaw support element adjacent the distal end of said handle shaft
   a connection rod extending from said jaw assembly to said activation arm.

2. The weed extraction device set forth in claim 1 wherein said handle shaft has the longitudinally offset parallel handgrip portion.

3. The weed extractor set forth in claim 1 wherein said movable jaw assembly comprises a jaw portion and a lever portion in transverse and spaced relationship to said jaw support element.

4. The weed extractor device set forth in claim 1 wherein said activation arm is of a known length so as to be selectively engaged with the ground when said jaw assembly is in planar relation to said ground.

5. The weed extractor device set forth in claim 1 wherein said jaw assembly has an open position and a closed position in response to movement of said handle shaft relative said activation arm when engaged with a ground surface.

6. The weed extractor set forth in claim 5 wherein said jaw is in a closed position, said activation arm functions as a fulcrum for said handle shaft when engaged on said ground surface and when said jaw is in a closed position.

7. The weed extractor set forth in claim 1 wherein said resilient means extending from said jaw assembly to said angularly offset jaw support comprises a coil spring.

8. The weed extractor set forth in claim 1 wherein said handle shaft is telescopically adjustable along its longitudinal axis.

9. The weed extractor set forth in claim 1 wherein said handle portion has a parallel angular offset grip engagement portion.

* * * * *